US00RE42909E

(19) United States
(12) Reissued Patent
Julian et al.

(10) Patent Number: US RE42,909 E
(45) Date of Reissued Patent: Nov. 15, 2011

(54) KNOCK-OUT PRESSURE TEST CAP WITH BREAKAWAY NIPPLE PLUG

(75) Inventors: Frank D Julian, Kansas City, MO (US); Duane R Condon, Ramona, CA (US)

(73) Assignee: Sioux Chief Mfg. Co., Inc., Perculiar, MO (US)

(21) Appl. No.: 11/416,474

(22) Filed: May 2, 2006

Related U.S. Patent Documents

Reissue of:
(64) Patent No.: 6,769,291
Issued: Aug. 3, 2004
Appl. No.: 10/370,225
Filed: Feb. 19, 2003

(51) Int. Cl.
*G01M 3/04* (2006.01)
(52) U.S. Cl. ..... 73/49.8; 73/49.5; 73/49.1; 138/90
(58) Field of Classification Search ..... 73/49.1, 73/49.5, 49.8; 138/90
See application file for complete search history.

(56) References Cited

U.S. PATENT DOCUMENTS 986,905 A * 3/1911 Carlson ..... 285/4
4,678,097 A * 7/1987 Crute ..... 220/288
4,763,510 A * 8/1988 Palmer ..... 73/40.5 R
4,768,560 A * 9/1988 Logsdon ..... 138/90
4,813,569 A * 3/1989 Ruiz ..... 220/254.8
4,860,796 A * 8/1989 Hagin ..... 138/90
4,899,903 A * 2/1990 Miyasaka et al. ..... 220/266
5,377,361 A * 1/1995 Piskula ..... 4/252.4
5,507,501 A * 4/1996 Palmer ..... 277/602
6,116,286 A * 9/2000 Hooper et al. ..... 138/93
6,170,529 B1 * 1/2001 Howe ..... 138/89

OTHER PUBLICATIONS

2001 Sales Catalog of Sioux Chief Manufacturing Company, Inc., specifically p. 155 showing the T.K.O. Knockout Closet.*

* cited by examiner

*Primary Examiner* — Daniel S Larkin
(74) *Attorney, Agent, or Firm* — Erickson, Kernell, Derusseau & Kleypas, LLC

(57) ABSTRACT

A pressure test cap includes a mounting collar with an outer rib to limit depth of insertion of the cap into a pipe. A closure disc which seals the mounting collar is connected to the collar through an inner rim by a weakened ring. An outer rim section registers with the inner rim so that impacts to the outer rim are transferred to the weakened ring to separate the disc from the collar. The closure disc includes a centrally positioned nipple for connection of a conduit of a pressurized test fluid source. The nipple is closed by a break-away nipple plug. The nipple plug has a centrally located indentation for piercing to bleed trapped air from the system and resealing by a screw.

30 Claims, 3 Drawing Sheets

KNOCK-OUT PRESSURE TEST CAP WITH BREAKAWAY NIPPLE PLUG

Matter enclosed in heavy brackets [ ] appears in the original patent but forms no part of this reissue specification; matter printed in italics indicates the additions made by reissue.

BACKGROUND OF THE INVENTION

Piping systems are used in structures to supply liquids and gasses and to-carry sewage and other wastes away. Common household piping or plumbing systems include water supply piping, drain piping, and possibly gas piping. Water supply pipes carry water from a water supply pipe to plumbing fixtures such as sinks, baths and showers, toilets, sprinkler systems, spigots, and the like. Drain piping carries human wastes, ground garbage from disposers, and waste water to sewers or septic tanks. Gas piping, if present, carries fuel gases such as natural gas or propane gas to appliances such as furnaces, ranges, gas fireplaces, and the like. A particularly necessary quality of all types of piping is integrity of the pipes and joints such that the liquids or gases carried do not leak.

In order to ensure that a piping system does not leak, pressure testing is often conducted and may be required by some local codes. Plumbing is preferably installed, tested, and joints repaired, as needed, prior to closing access to the piping and joints by the installation of wallboards. Testing often involves pressurizing the piping system with compressed air, or alternatively filling it with water, and detecting any leaks. Testing is usually done before any fixtures, appliances, or the like have been connected to the piping system.

Plastics, such as PVC or polyvinyl chloride and others, are used in many types of plumbing, including waste plumbing. It is common practice, during testing, to install removable test plugs or caps on pipe stubs to which fixtures, such as toilets, will be subsequently connected. After testing is completed, the caps are removed. The test caps need to be sealed in place such that they do not leak during testing. When the test caps are no longer needed, they need to be removed in such a manner that the test cap is not lost in the waste plumbing, such that the remaining plumbing is not damaged by removal of the test cap, and such that no remaining parts of the test cap assembly interfere with the fixture to be installed. Additional features which would be desirable in such a test cap include the capability of conveniently connecting a source of pressurized fluid to the cap and resealable structure for conveniently testing that the piping system is pressurized.

SUMMARY OF THE INVENTION

The present invention provides a knock-out pressure test cap with a break-away nipple plug which provides increased functionality in such a test cap. The cap includes a cylindrical mounting collar or wall sized to be sealingly positioned within a pipe. A mounting shoulder on the mounting wall limits the depth of insertion of the cap into the pipe. A closure disc closes the space surrounded by the mounting wall and is connected to the mounting wall by a weakened break line to enable separation of the closure disc from the mounting wall subsequent to testing.

The closure disc has a peripheral rim including an inwardly projecting inner or connection rim portion which connects the closure disc to the mounting wall by way of the break line. The peripheral rim also has an outwardly projecting outer or impact rim portion which is circumferentially aligned with the inner rim portion. Impacts, such as by a hammer, are transferred through the rim to the break line, causing it to fail or rupture such that impacts around the outer rim portion cause the closure disc to be separated from the mounting wall. The outer diameter of the inner rim is slightly greater than the inner diameter of the mounting wall so that the closure disc, once separated, cannot be knocked into the pipe and made difficult to recover.

A nipple with a removable nipple plug is formed on the closure disc. The nipple facilitates grasping of the cap with a user's fingers or with a wrench while applying cement to the cap mounting collar or insertion of the cap within a pipe to be sealed. The nipple plug is connected to the outer end of the nipple by a weakened break line, to facilitate separation of the nipple plug from the nipple. When the nipple plug is removed, a hose may be connected to the nipple to supply air or water to the pipe through the cap to pressurize the plumbing system for testing.

Various objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

Figure 1:
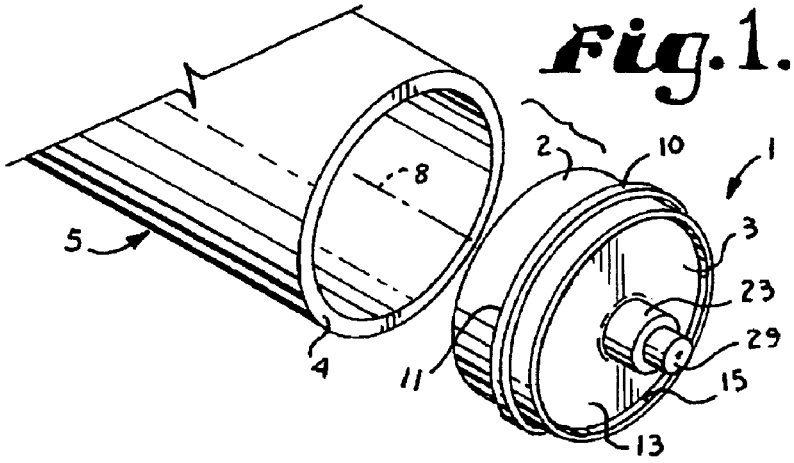
FIG. 1 is a perspective view illustrating a knock-out pressure test cap with a breakaway nipple plug which embodies the present invention.
Figure 2:
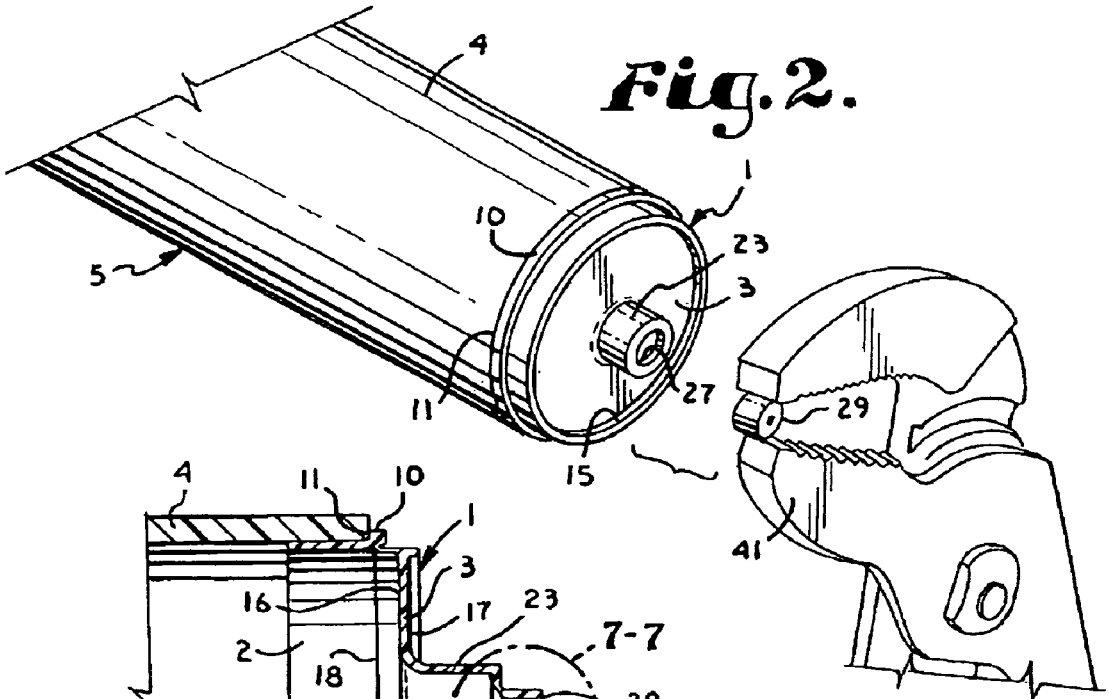
FIG. 2 is [an enlarged cross sectional view of the pressure test cap shown installed in a pipe stub] *a perspective view similar to FIG. 1 and illustrates removal of the breakaway nipple plug from the pressure test cap to enable fluid communication with the pipe.*

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a knock-out pressure test cap assembly with a breakaway nipple plug. The assembly 1 generally includes a mounting collar 2 and a closure disc 3 which is separably connected to the collar 2. The assembly 1 is used to seal a pipe stub 4 during pressure testing of a plumbing system including the pipe 4. After testing is completed, the closure disc 3 is removed to enable connection of a fixture to the pipe 4.

The mounting collar 2 is formed by a cylindrical wall 7, defined relative to a cap axis 8 (FIG. 1), and has a radially projecting and circumferentially extending rib 10 which includes an inner wall or shoulder which limits the depth of insertion of the collar 2 into the pipe 4. The rib 10 also includes an outer surface 12. The wall 7 has an external diameter sized to fit snugly into the pipe 4 to which the cap assembly 1 may be secured by gluing to form a pressure tight seal. The rib 10 has an outer diameter which preferably is smaller than the outer diameter of the pipe 4 to avoid interference with any structure, such as another pipe, which is sleeved over the end of the pipe 4, as will be described in more detail below.

Figure 6:
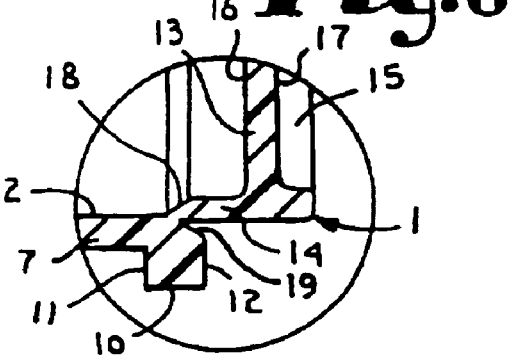
FIG. 6 is a greatly enlarged cross sectional view taken at detail 6-6 of FIG. [2] *3* and illustrates details of connection of a closure disc of the pressure test cap with a mounting collar.

The closure disc 3 includes a flat disc wall 13 which has a circular outer periphery and includes an outer rim formed by an inner rim section or portion 14 and an outer rim section or portion 15 (See FIG. 6). The inner rim section 14 projects inwardly from an inner surface 16 of disc wall 13, and the outer rim section 15 projects outwardly from an outer surface 17 of the disc wall 13.

The inner rim section 14 provides a structure for connecting the closure disc 3 to the mounting collar 2. The inner rim section 14 is connected to the mounting collar 2 by a weakened circumferential break line, weakened ring or region of reduced thickness 18 (FIG. 6) which is formed to be thinner than the inner rim section 14 and the cylindrical wall 7 to cause shearing of the inner rim section 14 from the mounting collar 2 along the break line 18 upon the application of a shearing force, which then enables removal of the closure disc 3 to provide access to the pipe 4. A circumferential groove 19 extends inward from the outer surface 12 of the rib 10 between the inner rim section 14 and rib 10 to space the weakened break line 18 axially inwardly of the outer surface 12 of the rib 10 of mounting collar 2.

Figure 8:
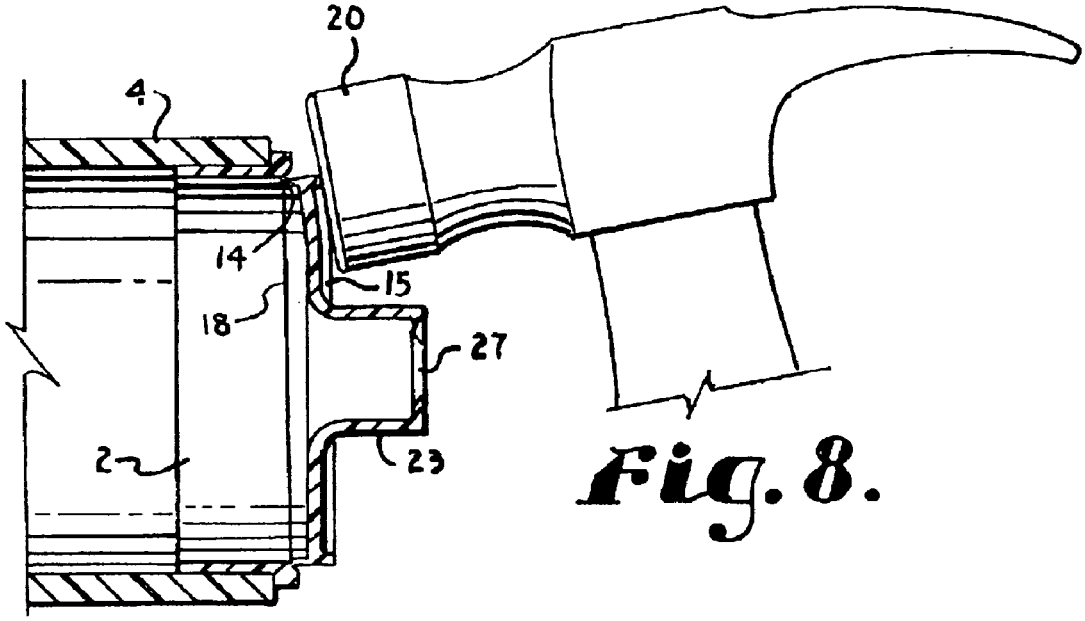
FIG. 8 is a view similar to FIG. [2] *3* and illustrates use of a hammer to strike an impact rim of the closure disc to separate the closure disc from the mounting collar of the pressure test cap.

The outer-rim section 15 is adapted for receiving impacts from a tool, such as from a hammer 20 (FIG. 8.), mallet, or the like, to transfer the force from the impacts as a shearing force through the inner rim section 14 to the weakened ring 18 to thereby cause the closure disc 3 to separate from the mounting collar 2 along the weakened ring 18. It is believed that the inward spacing of the weakened break line 18 helps direct the shearing force to the weakened line 18 to facilitate breaking away of the closure disc 3 along the weakened break line 18. Preferably, the outer diameter of the rim sections 14 and 15 are each slightly greater than an inner diameter of the mounting collar 2 to prevent the closure disc 3 from advancing past the inner surface of the mounting collar 2 and being lost within the pipe 4 when it is separated from the mounting collar 2.

Figure 7:
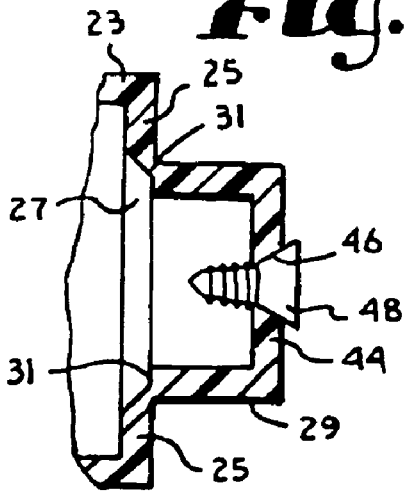
FIG. 7 is a greatly enlarged cross sectional view taken at detail 7-7 of FIG. [2] *3* and illustrates details a sealing screw positioned in the breakaway closure plug of the nipple of the pressure test cap.

A central region of the closure disc 3 has a cylindrical nipple 23 formed therethrough. The nipple 23, shown in cross-section in FIG. 7, has an end wall 25 through which is formed a nipple aperture 27. The aperture 27 is normally closed by a breakaway nipple plug 29 which is connected to the wall by a break line or weakened ring 31 (FIG. 7). The weakened ring 31 is formed to be thinner than the a sidewall of the nipple plug 29 and the end wall 25 of the nipple 23 to cause shearing of the nipple plug 29 from the nipple 23 along the break line weakened ring 31 upon the application of a shearing force to provide access to the nipple aperture 27.

Figure 3:
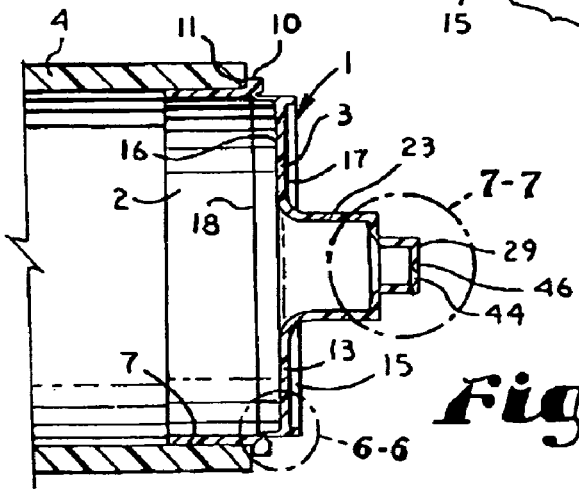
FIG. 3 is [a perspective view similar to FIG. 1 and illustrates removal of the breakaway nipple plug from the pressure test cap to enable fluid communication with the pipe] *an enlarged cross sectional view of the pressure test cap shown installed in a pipe stub.*
Figure 4:
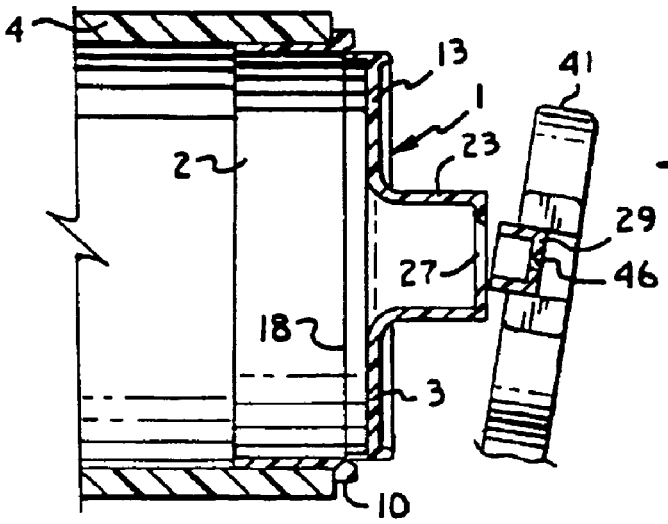
FIG. 4 is a view similar to FIG. [2] *3* and illustrates the pressure test cap installed in a pipe stub and further details of removal of the breakaway nipple plug.
Figure 5:
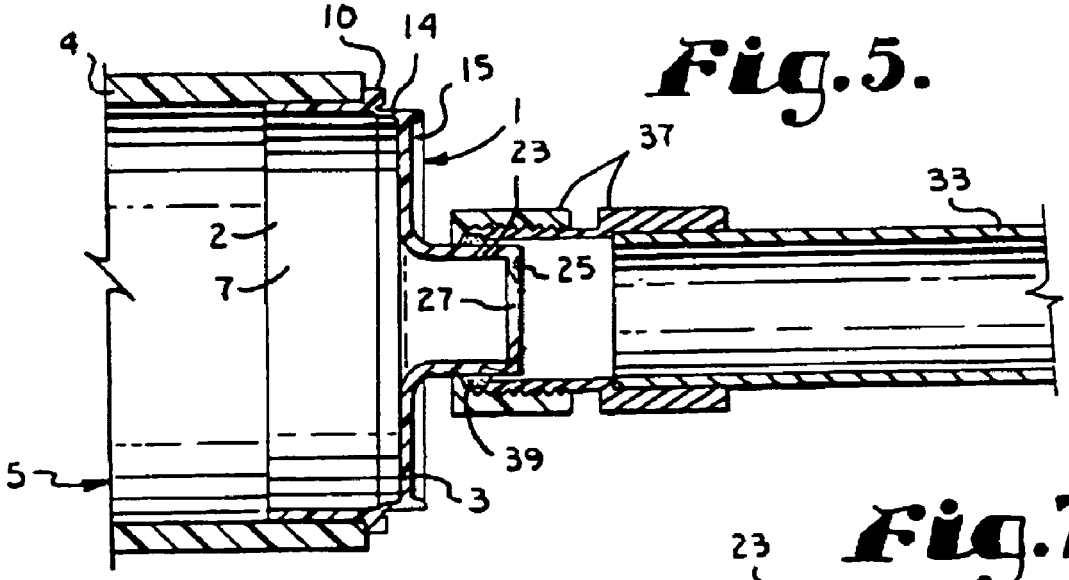
FIG. 5 is a view similar to FIG. [2] *3* and illustrates the pressure test cap installed in a pipe stub with a pressurized fluid supply conduit connected to a nipple of the cap.

The nipple 23 provides for connection of a conduit 33 (FIG. 5) to the assembly 1. The conduit 33 is connected at an opposite end to a source (not shown) of a pressurized fluid, such as compressed air or a liquid, which is used to pressure test the piping system 5. The illustrated conduit 33 is connected to the nipple 23 by a threaded connector set 37 which compresses an O-ring 39 into sealing engagement with an outer surface of the nipple 23 when parts of the connector set 37 are rotated relative to one another. The nipple plug 29 is separable from the end wall 25 of the nipple 23 by breaking it away using a tool, such as the pliers 41 illustrated in FIGS. 3 and 4. Alternatively, the plug 29 could be separated by an impact tool, such as the hammer 20 or cut off with a saw or knife. Use of a pair of pliers 41 is preferable in that a sufficient amount of shear force can be applied at the weakened break line 31 of the plug 29 to separate it from the nipple 23 by crushing and twisting it with the pliers 41 without applying sufficient shear force to the weakened break line 18 of the closure disc 3 to cause it to separate from the mounting collar 2.

The nipple plug 29 includes an end wall 44 (FIG. 7) with a conical test indentation or dimple 46 formed therein. The indentation 46 is a thinning of the end wall 44 at a centered location on the wall 44 which can be punctured, as by a screw 48 or a sharp tool (not shown), to test whether the piping system 34 is pressurized. The indentation 46 can then be plugged by the screw 48 to reseal the nipple plug 29.

The pressure test cap assembly 1 is typically installed in a pipe stub 4 using an adhesive, glue or cement between an outer surface of the collar 2 and an inner surface of the pipe stub 4. Assemblies 1, thus, are installed in all the pipe stubs 4 of a home, apartment, office, or other system 5 of pipes 4. Prior to connection of the system 5 to an outside fluid supply or sewer system, a nipple plug 29 of one of the assemblies 1 is removed, and a supply conduit 33 is connected to the nipple 23 to supply a pressurized fluid to the system 5. If the fluid is a liquid, the liquid is preferably introduced into the piping system 5 at the lowest level available. While pressurized, some of the indentations 46 may be pierced to bleed trapped air from the plumbing system to displace the trapped air with water. The indentations 46 may also be pierced to test for pressurization of the system 5. Once the air is bled from the line the cap may be resealed by securing a screw 48 in the hole pierced in the indentation 46. The piping system 5 is then inspected to detect any leakage. Instruments of various kinds may be employed in leak testing or, alternatively, visual inspections may be conducted. If leaks are detected, after depressurization of the system 5, the leaking parts are repaired, and the system 5 may be repressurized for testing. The pressurization, inspection, and repair cycles may be repeated as often as necessary to certify the piping system 5 leak-free.

Once the pressure tests have been completed, the closure discs 3 can be removed prior to installation of each fixture to its respective stub 4. A tool such as the hammer 20 is used to apply impacts about the outer rim 15 of the disc 3 to thereby break the inner rim 14 from the mounting collar 2 and separate the closure disc 3 from the collar 2. The closure disc 3 cannot be lost in the pipe 4 because the outer diameter of the inner rim 14 is slightly greater than the inner diameter of the pipe 4.

Alternatively, the cap assembly 1 is designed to facilitate use of a saw or other cutting instrument to separate the closure disc 3 from the mounting collar 2. The length of the inner rim section 14 spaces the disc wall 13 outward from the outer surface 12 of the rib 10 and from the mounting collar 2. The length of the inner rim section 14 is selected in part to allow a saw blade to be positioned between the outer surface 12 of rib 10 and an inner surface of the disc wall 13. Using the outer surface 12 of rib 10 generally as a guide, a saw or other cutting device can be used to cut through the inner rim section 14 to thereby separate the disc wall from the mounting collar 2 to provide access to the pipe 4. Again, the closure disc 3 cannot be lost in the pipe 4 because the outer diameter of the inner rim 14 is slightly greater than the inner diameter of the pipe 4.

Figure 9:
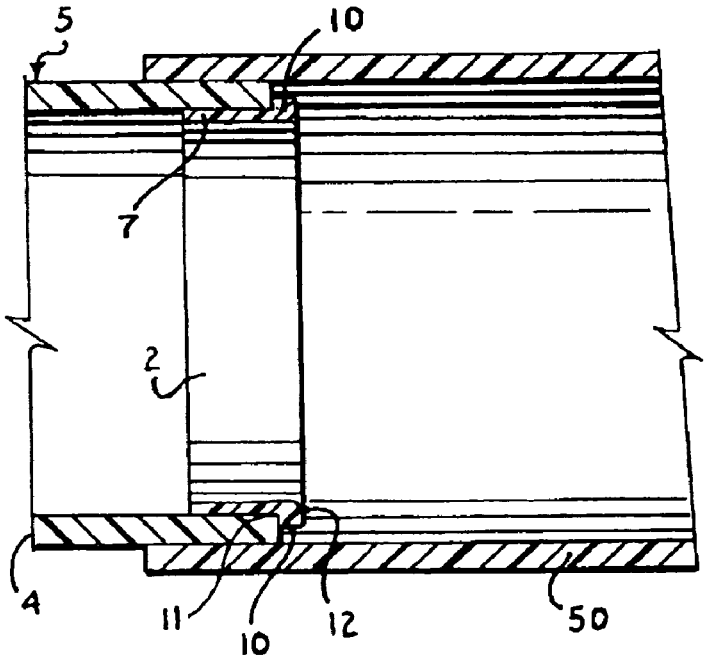
FIG. 9 is a cross sectional view showing the mounting collar of the pressure test cap after removal of the closure disc and its non-interference with a fitting sleeved onto the pipe stub previously sealed by the pressure test cap.

As shown in FIG. 9, the rib 10 forming the shoulder 11 has an outer diameter less than the outer diameter of the pipe 4. Thus, a fitting, which might also be referred to as a second pipe section, 50 can be telescoped over the pipe stub 4 without interference by the rib 10 of the mounting collar 2. For this reason, there is no need to remove the mounting collar 2 from the pipe stub 4.

The thickness of the weakened ring 18 connecting the closure disc 3 to mounting collar 2 and weakened ring 31 connecting nipple plug 29 to nipple 23 are selected to prevent shearing thereacross due to the internal pressure to which the pressure test cap is subjected during pressure testing, without requiring an unreasonable amount of shearing force to be applied to [separated] *separate* the components using a hammer or a wrench.

When using pressure test caps with PVC [pipe] *piping*, the cement used generally functions as a solvent, dissolving a portion of the pipe before resetting to form a pressure tight seal. Care must be taken with such pressure test caps to keep the cement from being mistakenly applied on the weakened areas of pressure test caps. With the pressure test cap assembly 1 shown and described herein, a user may grasp the cap assembly 1 using the nipple 23 to facilitate the application of cement to the outer wall 7 of the mounting collar 2. Rib 10 provides a barrier to assist in keeping cement from migrating onto the weakened ring 18 of the cap assembly 1. In addition, spacing the weakened ring 18 inward from the outer surface 12 of the rib 10 further protects the weakened ring 18 from cement which may flow out of the end of the pipe when the cap is inserted therein. Grasping of the cap assembly 1 by the nipple 23 also facilitates insertion of the mounting collar 2 into the end of a pipe 4.

It is to be understood that while certain forms of the present invention have been illustrated and described herein, it is not to be limited to the specific forms or arrangement of parts described and shown. For example, it is foreseen that the nipple plug could be solid or that the cap assemblies could be provided without a nipple plug and the end of the nipple would simply be closed or opened by puncturing the end wall of the nipple or cutting off the end wall of the nipple. It is also foreseen that the nipple could be a solid stem to facilitate grasping by a user and not designed to allow connection of a supply hose thereto.

The cap assemblies could be provided without the circumferentially extending rib 10. Without the rib 10 the cap assembly 1 could be slid far enough into a pipe 4 to recess the nipple 23 and nipple plug 29 within the pipe 4. Recessing the nipple 23 and nipple plug 29 reduces the likelihood that someone might inadvertently shear off the nipple plug 29 or the closure disc 3 by accidentally dropping something on or striking the nipple 23 or nipple plug 29. The nipple 23, plug 29 and the disc 3 may also be colored to help locate the installed cap assemblies 1.

What is claimed and desired to secure by letters patent is:

1. A pressure test cap assembly for use in pressure testing a piping installation including a pipe and comprising:

(a) a cylindrical mounting wall [sized for insertion into and sealing engagement with a pipe, said mounting wall] defining a cap axis extending axially therethrough;

(b) a closure disc removably connected to said mounting wall [and cooperating therewith to seal a pipe when said mounting wall is positioned in sealing engagement with the pipe with said closure disc connected thereto] *to prevent flow therethrough*, said disc having an inner disc surface and an opposite outer disc surface;

(c) said closure disc having a peripheral rim which is cylindrical about said cap axis and includes an inner rim portion projecting axially inward from said inner disc surface and an outer rim portion projecting axially outward from said outer disc surface; and (d) said closure disc being connected to said mounting wall by said inner rim portion in such a manner that impacts of a selected strength to said outer rim portion, in a direction substantially parallel to said cap axis, are operative to rupture a connection of said closure disc to said mounting wall to thereby enable removal of said disc from said mounting wall.

2. An assembly as set forth in claim 1 and including:

(a) a tubular nipple extending from said outer disc surface and having an open nipple end opening through said closure disc;

(b) said nipple having an opposite connection end which is sized and shaped to enable connection of a source of pressurized fluid thereto; and (c) a breakaway nipple plug removably connected to said nipple connection end by a weakened ring so as to be separable from said nipple by a shearing force to enable flow therethrough.

3. An assembly as set forth in claim 2 and including:

(a) said breakaway nipple plug having an indentation configured for piercing to create an opening through said closure [member] *disc*.

4. An assembly as set forth in claim 1 wherein:

(a) said mounting wall *is sized for insertion into a piping and* includes a radially outwardly extending circumferential shoulder wall positioned to limit depth of insertion of said assembly into [a] *the* pipe.

5. An assembly as set forth in claim 4 wherein:

(a) said shoulder wall has a radial thickness which is less than an outer diameter of a first pipe into which said assembly is installed to avoid interference with a fitting which is telescoped over [such a] *the* first pipe.

6. An assembly as set forth in claim 4 wherein:

(a) said shoulder wall has a shoulder outer end surface; and (b) said inner rim *portion* has such an axial length as to space said inner disc surface axially outward of said shoulder outer end surface.

7. An assembly as set forth in claim 1 wherein:

(a) said inner rim *portion* is connected to said mounting wall along a weakened circumferential break line; and (b) said inner rim *portion* has such an axial length as to space said inner disc surface axially outward of said break line.

8. An assembly as set forth in claim 1 wherein:

(a) said cylindrical mounting wall has a mounting wall inner diameter;

(b) said peripheral rim has a peripheral rim diameter; and (c) said peripheral rim diameter is greater than said mounting wall inner diameter.

9. A pressure test cap assembly for use in pressure testing a piping installation including a pipe and comprising:

(a) a mounting structure sized and shaped to enable connection to a [pipe] *piping installation*;

(b) a separable closure member connected to said mounting structure to prevent flow therethrough, said closure member being separable from said mounting structure to enable flow therethrough;

(c) said closure member including a tubular nipple having an open nipple end opening through said closure member and an opposite nipple connection end, said nipple being sized and shaped to enable connection of a source of pressurized fluid thereto; and (d) a breakaway nipple plug connected to said nipple by a weakened ring, said nipple plug normally closing said nipple connection end to prevent flow therethrough, said [closure member] *nipple plug* being separable from said nipple by applying a shear force to said weakened ring to enable flow therethrough.

10. An assembly as set forth in claim 9 wherein:

(a) said mounting structure includes a cylindrical mounting wall [having an inner end sized for insertion into and sealing engagement with a pipe, said mounting wall] defining a cap axis;

(b) said closure member includes a closure disc connected to said mounting wall [and cooperating therewith to pressure seal a pipe when said mounting wall sealingly engages such a pipe with said closure disc intact] *to prevent flow therethrough*, said disc having an inner disc surface and an opposite outer disc surface;

(c) said closure disc has a peripheral rim which is cylindrical about said cap axis and includes an inner rim portion projecting inwardly from said inner disc surface and an outer rim portion projecting outwardly from said outer disc surface; and (d) said closure disc is connected to said mounting wall by said inner rim portion in such a manner that impacts of a selected strength to said outer rim portion, in a direction substantially parallel to said cap axis, are operative to rupture a connection of said closure disc to said mounting wall to thereby enable removal of said disc from said mounting wall.

11. An assembly as set forth in claim 10 wherein:

(a) said mounting wall *is sized for insertion into a pipe and* includes a radially outwardly extending circumferential shoulder wall positioned to limit depth of insertion of said assembly into [a] *the* pipe;

(b) said shoulder wall has a shoulder outer end surface; and (c) said inner rim *portion* has such an axial length as to space said inner disc surface axially outward of said shoulder outer end surface.

12. An assembly as set forth in claim 10 wherein:

(a) said inner rim is connected to said mounting wall along a weakened circumferential break line; and (b) said inner rim has such an axial length as to space said inner disc surface axially outward of said break line.

13. An assembly as set forth in claim [9] *10* wherein:

(a) said cylindrical mounting wall has a mounting wall inner diameter;

(b) said closure disc has an outer disc diameter; and (c) said outer disc diameter is greater than said mounting wall inner diameter.

14. An assembly as set forth in claim 9 and including:

(a) said [closure member] *nipple plug* having a test indentation configured for piercing.

15. An assembly as set forth in claim 9 wherein:

(a) said mounting [wall] *structure* includes a radially outwardly extending circumferential shoulder wall positioned to limit depth of insertion of said assembly into a pipe.

16. An assembly as set forth in claim 15 wherein:

(a) said shoulder wall has a radial thickness which is less than an outer diameter of a first pipe into which said assembly is installed to avoid interference with a fitting which is telescoped over [such a] *the* first pipe.

17. A pressure test cap assembly for use in pressure testing a piping installation including a pipe and comprising:

(a) a cylindrical mounting collar [having an inner end sized for insertion into and sealing engagement with a pipe, said mounting collar] defining a cap axis and a mounting collar inner diameter relative to said cap axis;

(b) a closure disc connected to said mounting collar [and cooperating therewith to pressure seal a pipe when said mounting collar sealingly engages such a pipe with said closure disc intact] *to prevent flow therethrough*, said disc having an inner disc surface and an opposite outer disc surface; (c) said closure disc having a peripheral rim which is cylindrical about said cap axis and includes an inner rim portion projecting axially inward from said inner disc surface and having a rim diameter and an outer rim portion projecting axially outward from said outer disc surface;

(d) said closure disc being connected to said mounting collar by said inner rim portion in such a manner that impacts of a selected strength to said outer rim portion, in a direction substantially parallel to said cap axis, are operative to rupture a connection of said closure disc to said mounting collar to thereby enable removal of said disc from said mounting collar;

(e) said closure disc including a tubular nipple having an open nipple end opening through said closure disc and an opposite nipple connection end, said nipple being sized and shaped to enable connection of a source of pressurized fluid thereto;

(f) a breakaway nipple plug connected to said nipple by a weakened ring, said nipple plug normally closing said nipple connection end to prevent flow therethrough, said [closure] *nipple* plug being separable from said nipple by applying a shear force to said weakened ring to enable flow therethrough; and (g) said rim diameter being greater than said mounting collar inner diameter.

18. An assembly as set forth in claim 17 and including:

(a) said [closure] *nipple* plug having a test indentation configured for piercing.

19. An assembly as set forth in claim 17 wherein:

(a) said mounting collar *is sized for insertion into a pipe and* includes a radially outwardly extending circumferential shoulder wall positioned to limit depth of insertion of said assembly into [a] *the* pipe;

(b) said shoulder wall has a radial thickness which is less than an outer diameter of a first pipe into which said assembly is installed to avoid interference with a fitting which is telescoped over [such a] *the* first pipe;

(c) said shoulder wall has a shoulder outer end surface;

(d) said inner rim *portion* has such an axial length as to space said inner disc surface axially outward of said shoulder outer end surface;

(e) said inner rim *portion* is connected to said mounting collar along a weakened circumferential break line; and (f) said axial length of said *inner* rim *portion* is sufficient to space said inner disc surface axially outward of said break line.

20. A pressure test cap for use in pressure testing a piping installation including a pipe and comprising:

(a) a mounting collar [having a mounting wall sized for insertion into and sealing engagement with a pipe, said mounting collar] defining a cap axis extending axially therethrough;

(b) a closure disc connected to and extending across an outer end of said mounting collar to close said [mounting collar] outer end *of said mounting collar*;

(c) said closure disc having an inner rim projecting axially inward from an inner surface thereof; and (d) said inner rim of said closure disc being connected to said mounting collar along a break line which is spaced inwardly from said outer end of said mounting collar; said break line being more susceptible to shear than said inner rim and said mounting collar, at least when said mounting [wall] *collar* is secured [within a pipe] *to a piping installation*.

21. A pressure test cap for use in pressure testing a piping installation including a pipe and comprising:

(a) a mounting collar [having a mounting wall sized for insertion into and sealing engagement with a pipe, said mounting collar] defining a cap axis extending axially therethrough;

(b) a closure disc connected to and extending across an outer end of said mounting collar to close said [mounting collar] outer end *of said mounting collar*;

(c) said closure disc having an inner rim projecting axially inward from an inner surface thereof; and (d) said inner rim of said closure disc being connected to said mounting collar by a region of reduced thickness positioned in *an* inwardly spaced relationship from said outer end of said mounting collar; said region of reduced thickness being thinner than said inner rim of said closure disc and thinner than a portion of said mounting collar to which said region of reduced thickness is connected.

22. A pressure test cap assembly for use in pressure testing a piping installation including a pipe and comprising:

(a) a mounting collar [sized for insertion into sealing engagement with a pipe, said mounting collar] defining a cap axis extending axially therethrough and having an outer end;

(b) a closure disc having inner and outer disc surfaces, and an inner rim projecting axially inward from said inner disc surface and spacing said inner disc surface axially outward from said mounting collar outer end; wherein:

(c) said inner rim is connected to said outer end of said mounting collar at a weakened circumferential break line such that impacts of a selected strength applied to said closure disc, in a direction substantially parallel to said cap axis, are operative to rupture said weakened circumferential break line to thereby enable removal of said disc from said mounting collar.

23. An assembly as set forth in claim 22 wherein said mounting collar has a uniform inside diameter and said closure disc has an outside diameter greater than said uniform inside diameter of said mounting collar.

24. An assembly as set forth in claim 22 wherein said weakened circumferential break line is an area of reduced thickness formed at [the] *a* base of an annular groove formed in said outer end of said mounting collar adjacent said inner rim of said closure disc.

25. An assembly as set forth in claim 22 *wherein said mounting collar is sized for insertion into a pipe* and further [including] *includes* a radially outwardly extending circumferential shoulder wall positioned to limit depth of insertion of said assembly into [a] *the* pipe.

26. An assembly set forth in claim 22 wherein said closure disc further includes an outer rim projecting axially outward from said outer disc surface.

*27. A pressure test cap assembly for use in pressure testing a piping installation including a pipe and comprising:*

*(a) a mounting collar;*

*(b) a closure member connected to said mounting collar to prevent flow therethrough and including a tubular nipple having an open nipple end opening through said closure member and an opposite nipple connection end, said nipple being sized and shaped to enable connection of a source of pressurized fluid thereto; and*

*(c) a breakaway nipple plug connected to said nipple by a weakened ring, said nipple plug normally closing said nipple connection end to prevent flow therethrough, said nipple plug being separable from said nipple by applying a shear force to said weakened ring to enable flow therethrough.*

*28. An assembly as set forth in claim 27 wherein said closure member is separable from said mounting collar to enable flow therethrough.*

*29. An assembly as set forth in claim 28 wherein:*

*(a) said mounting collar defines a cap axis;*

*(b) said closure member includes a closure disc connected to said mounting collar, said disc having an inner disc surface, an opposite outer disc surface, and a peripheral rim which is cylindrical about said cap axis and includes an inner rim portion projecting inwardly from said inner disc surface and an outer rim portion projecting outwardly from said outer disc surface; and*

*(c) said closure disc is connected to said mounting collar by said inner rim portion in such a manner that impacts of a selected strength to said outer rim portion, in a direction substantially parallel to said cap axis, are operative to rupture a connection of said closure disc to said mounting collar to thereby enable removal of said disc from said mounting collar.*

*30. An assembly as set forth in claim 28, wherein:*

*(a) said mounting collar defines a cap axis and has an outer end;*

*(b) said closure member includes a closure disc having inner and outer disc surfaces, and an inner rim projecting axially inward from said inner disc surface and spacing said inner disc surface axially outward from said mounting collar outer end; wherein:*

*(c) said inner rim is connected to said outer end of said mounting collar at a weakened circumferential break line such that impacts of a selected strength applied to said closure disc, in a direction substantially parallel to said cap axis, are operative to rupture said weakened circumferential break line to thereby enable removal of said disc from said mounting collar.*

* * * * *